United States Patent
Watazawa

(10) Patent No.: US 10,863,103 B2
(45) Date of Patent: Dec. 8, 2020

(54) SETTING APPARATUS, SETTING METHOD, AND STORAGE MEDIUM

(71) Applicant: CANON KABUSHIKI KAISHA, Tokyo (JP)

(72) Inventor: Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 16/276,811

(22) Filed: Feb. 15, 2019

(65) Prior Publication Data
US 2019/0260921 A1    Aug. 22, 2019

(30) Foreign Application Priority Data

Feb. 21, 2018  (JP) ................ 2018-029049
Feb. 4, 2019   (JP) ................ 2019-018259

(51) Int. Cl.
H04N 5/235   (2006.01)
G06T 5/00    (2006.01)
G06K 9/00    (2006.01)
H04N 5/202   (2006.01)

(52) U.S. Cl.
CPC ....... *H04N 5/2354* (2013.01); *G06K 9/00248* (2013.01); *G06K 9/00281* (2013.01); *G06T 5/009* (2013.01); *H04N 5/202* (2013.01)

(58) Field of Classification Search
CPC ...... H04N 5/2354; H04N 5/202; G06T 5/009; G06K 9/00281; G06K 9/00248
See application file for complete search history.

(56) References Cited

U.S. PATENT DOCUMENTS

2016/0127630 A1* 5/2016 Kitajima ............. H04N 5/2351 348/370
2016/0134807 A1* 5/2016 Tsutsumi ............. H04N 5/272 348/222.1

FOREIGN PATENT DOCUMENTS

JP    2016-072694 A    5/2016

* cited by examiner

*Primary Examiner* — Ruipig Li
(74) *Attorney, Agent, or Firm* — Cowan, Liebowitz & Latman, P.C.

(57) ABSTRACT

A setting apparatus comprises a setting unit that sets a virtual light parameter for applying an effect of irradiating virtual light on a plurality of subjects included in an image; and a classification unit that classifies the plurality of subjects into a plurality of groups based on a state of shadow. The setting unit sets the virtual light parameter for each group classified by the classification unit.

17 Claims, 11 Drawing Sheets

VIRTUAL LIGHT
SOURCE

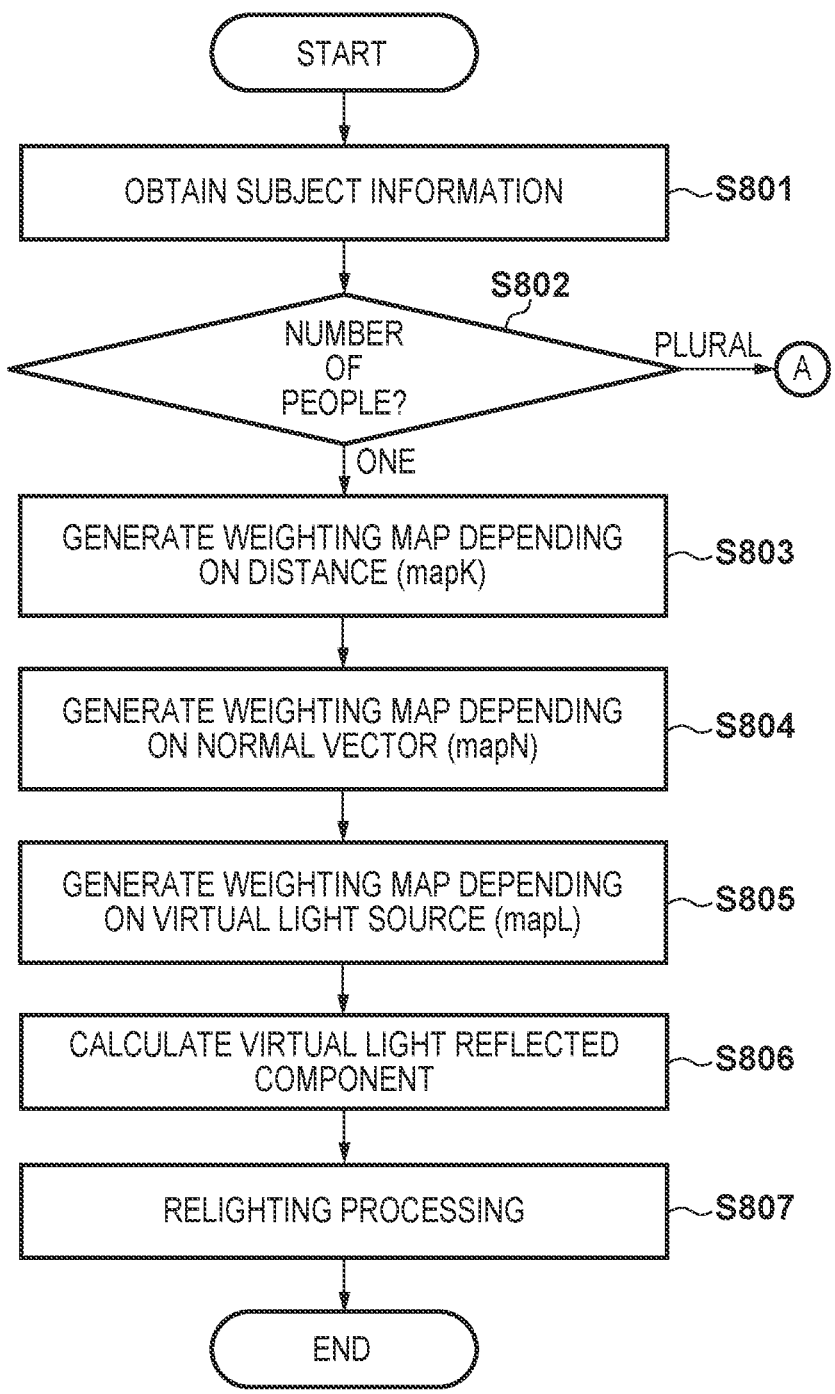

FIG. 11

| SUBJECT NO. | COORDINATES OF FACE CENTER | SHADOW INFORMATION | GROUP |
|---|---|---|---|
| 1 | $(x_1, y_1)$ | FACE ILLUMINATED | I |
| 2 | $(x_2, y_2)$ | UPPER RIGHT PORTION OF FACE IN SHADOW | II |
| 3 | $(x_3, y_3)$ | FACE IN SHADOW | III |
| 4 | $(x_4, y_4)$ | FACE IN SHADOW | III |
| 5 | $(x_5, y_5)$ | FACE IN SHADOW | III |
| 6 | $(x_6, y_6)$ | FACE ILLUMINATED | I |
| 7 | $(x_7, y_7)$ | FACE ILLUMINATED | I |
| 8 | $(x_8, y_8)$ | FACE IN SHADOW | III |
| 9 | $(x_9, y_9)$ | FACE IN SHADOW | III |
| 10 | $(x_{10}, y_{10})$ | FACE IN SHADOW | III |
| 11 | $(x_{11}, y_{11})$ | FACE IN SHADOW | III |
| 12 | $(x_{12}, y_{12})$ | FACE IN SHADOW | III |

SETTING APPARATUS, SETTING METHOD, AND STORAGE MEDIUM

BACKGROUND OF THE INVENTION

Field of the Invention

The present invention relates to a technique for correcting the brightness of an input image.

Description of the Related Art

Conventionally, a technique of relighting processing which irradiates light from a virtual light source to a subject in a shot image is known. By performing the relighting processing, it is possible to brighten a dark area such as shadow caused by an ambient light and obtain a desired image.

For example, Japanese Patent Laid-Open No. 2016-72694 discloses relighting processing that can appropriately correct a shadow of a subject. Specifically, the state of shadows of a predetermined area of the photographed image is detected, and characteristics of a virtual light source are determined based on the detected state of shadows. Then, the shot image is corrected so that the state of shadows becomes the state as when the subject is irradiated with light from the virtual light source having the determined characteristics.

However, according to the method disclosed in the Japanese Patent Laid-Open No. 2016-72694, for example, in the case where a large number of people are photographed as subjects, after detecting the state of shadow of each subject, the characteristics of the virtual light source suitable for each subject are determined. Accordingly, since the characteristics of the virtual light source are repeatedly calculated for the number of people, the time taken to perform relighting processing increases.

Further, even in an application in which the user can arbitrarily set the parameters of the virtual light source, in the case where a large number of people are photographed as subjects, for example, it is very troublesome for the user to set the virtual light source parameters for each subject.

SUMMARY OF THE INVENTION

The present invention has been made in consideration of the above situation, and reduce the time taken to perform relighting processing even in the case where a plurality of people are photographed as subjects.

According to the present invention, provided is a setting apparatus comprising at least one processor and/or circuit configured to function as following units: a setting unit that sets a virtual light parameter for applying an effect of irradiating virtual light on a plurality of subjects included in an image; and a classification unit that classifies the plurality of subjects into a plurality of groups based on a state of shadow, wherein the setting unit sets the virtual light parameter for each group classified by the classification unit.

Further, according to the present invention, provided is a setting method comprising: classifying a plurality of subjects included in an image into a plurality of groups based on a state of shadow, setting a virtual light parameter for applying an effect of irradiating virtual light on a plurality of subjects for each group classified by the classification unit.

Furthermore, according to the present invention, provided is a non-transitory storage medium readable by a computer, the storage medium storing a program that is executable by the computer, wherein the program includes program code for causing the computer to function as a setting apparatus, comprising: a setting unit that sets a virtual light parameter for applying an effect of irradiating virtual light on a plurality of subjects included in an image; and a classification unit that classifies the plurality of subjects into a plurality of groups based on a state of shadow, wherein the setting unit sets the virtual light parameter for each group classified by the classification unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart showing relighting processing according to the embodiment;

FIG. 11 is a diagram for explaining grouping according to the embodiment.

DESCRIPTION OF THE EMBODIMENTS

Exemplary embodiments of the present invention will be described in detail in accordance with the accompanying drawings. In this embodiment, an example in which the present invention is applied to a digital camera as an image capturing apparatus will be described.

Figure 1:
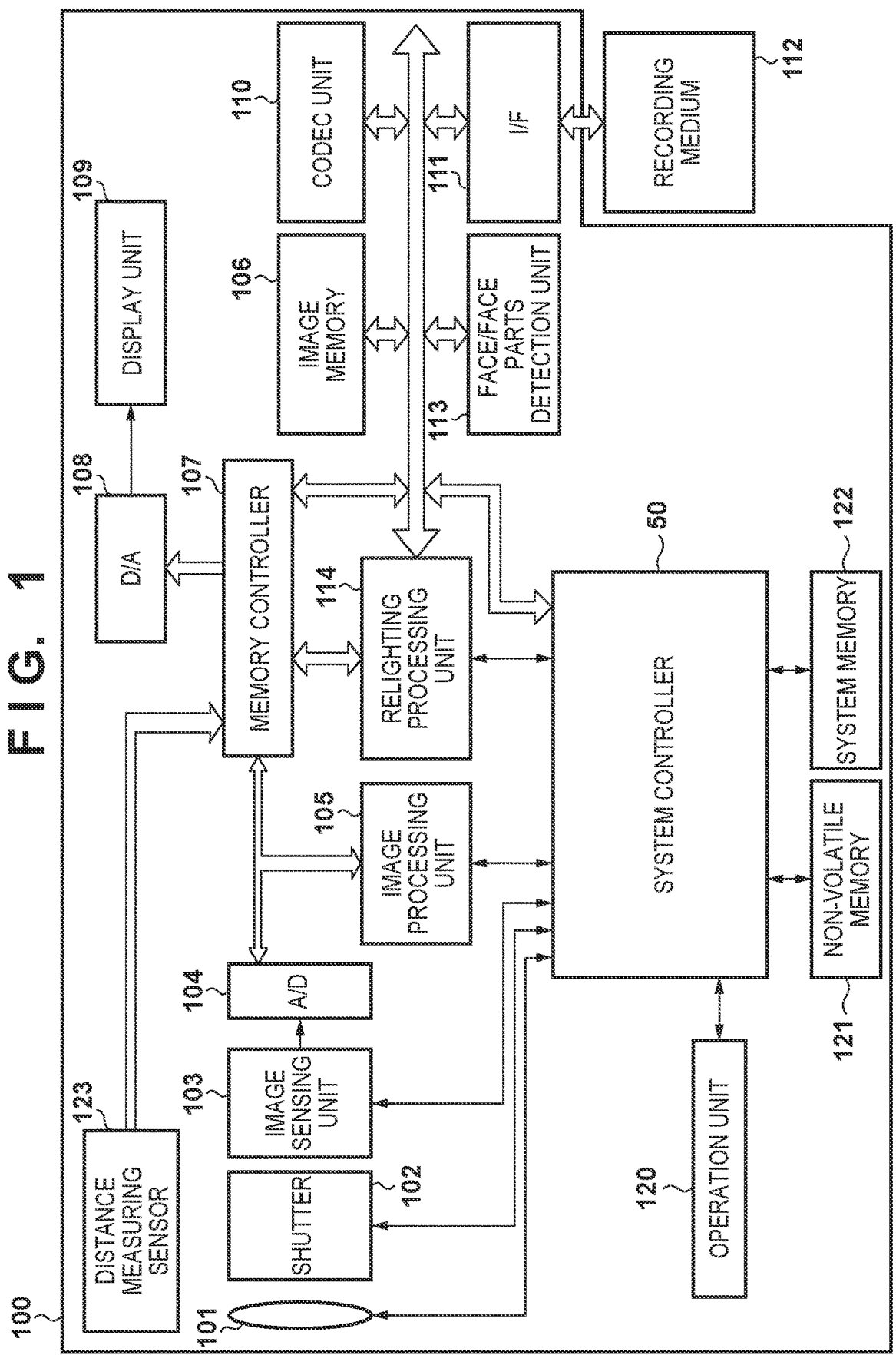
FIG. 1 is a block diagram showing a configuration of a digital camera according to an embodiment of the present invention.

FIG. 1 is a block diagram illustrating an example of a configuration of a digital camera 100 according to a first embodiment. In the digital camera 100 as shown in FIG. 1, light that has entered through a lens group 101 (an imaging optical system) that includes a zoom lens and a focus lens, and a shutter 102 having an aperture stop function, undergoes photoelectric conversion in an image sensing unit 103. The image sensing unit 103 is comprised of CCD, CMOS sensor, or the like, and an electric signal obtained by the photoelectric conversion is output to an A/D converter 104 as an image signal. The A/D converter 104 converts an analog image signal output from the image sensing unit 103 to a digital image signal (image data), and outputs the digital image signal to an image processing unit 105.

The image processing unit 105 applies to the image data from the A/D converter 104, or image data read out from an image memory 106 via a memory controller 107 a variety of image processes, such as a color conversion process including white balance correction, γ correction, an edge enhancing process, color correction, and so on. The image data output from the image processing unit 105 is written to the image memory 106 via the memory controller 107. The image memory 106 stores image data output from the image processing unit 105 and image data to be displayed on a display unit 109.

A face/face parts detection unit 113 detects a face and a face-part region where a human face and face parts exist in a captured image. The image processing unit 105 performs a predetermined evaluation value calculation process using the result of the face detection and the result of the face-part detection by the face/face parts detection unit 113 and the captured image data, and a system controller 50 performs exposure control and focus control using the obtained evaluation values. In this manner, through-the-lens auto focus (AF) processing, auto exposure (AE) processing, and auto white balance (AWB) processing, and so forth, are performed.

A D/A converter 108 converts the digital image data for display stored in the image memory 106 into an analog signal, and provides the analog signal to the display unit 109. The display unit 109 displays an image on a display screen, such as LCD, in accordance with the analog signal from the D/A converter 108.

A codec unit 110 compresses and encodes the image data stored in the image memory 106 based on standards, such as JPEG and MPEG. The system controller 50 stores the encoded image data to a recording medium 112, such as a memory card, hard disk, and so on, via an interface (I/F) 111. Further, image data read out from the recording medium 112 via the I/F 111 is decoded and expanded by the codec unit 110, and stored in the image memory 106. By displaying the image data stored in the image memory 106 on the display unit 109 via the memory controller 107 and the D/A converter 108, an image can be reproduced and displayed.

A relighting processing unit 114 performs relighting processing that corrects brightness of a captured image by illuminating with a virtual light source. The relighting processing performed by the relighting processing unit 114 will be explained later in detail.

The system controller 50 performs overall control of the digital camera 100. A non-volatile memory 121 is configured with memory, such as EEPROM, and stores programs and parameters that are necessary, for processing by the system controller 50. Each process of the present invention as described later is realized by developing, in a system memory 122, programs, constants and variables stored in the non-volatile memory 121 for operation of the system controller 50 and executing the programs.

An operation unit 120 receives operation, such as a menu setting, an image selection, and so on, by a user. A distance measuring sensor 123 measures the distance to an object, and outputs distance information corresponding to each pixel of a captured image (distance information detection).

Figure 2:
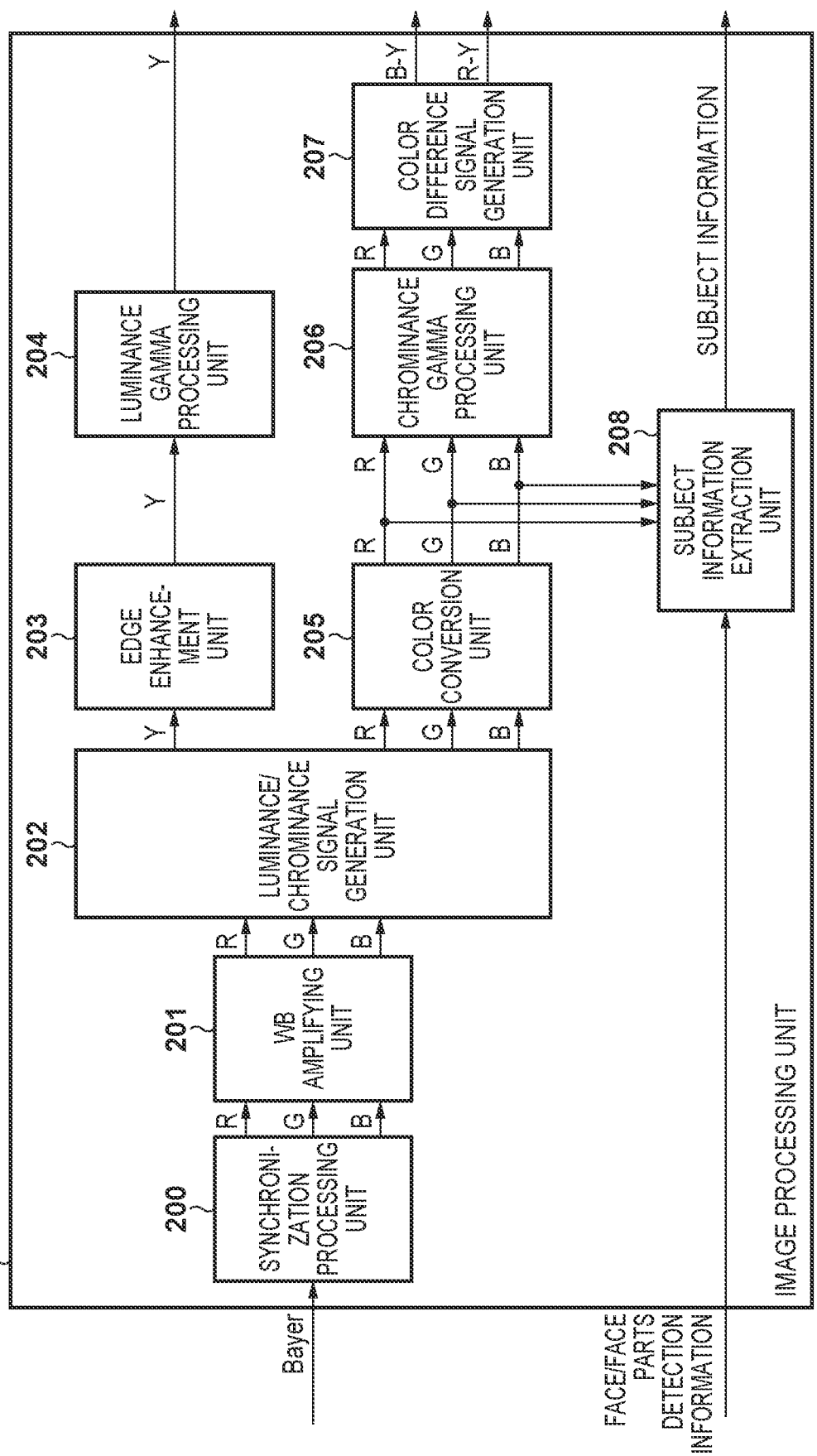
FIG. 2 is a block diagram showing a configuration of an image processing unit according to the embodiment.
Figure 3:
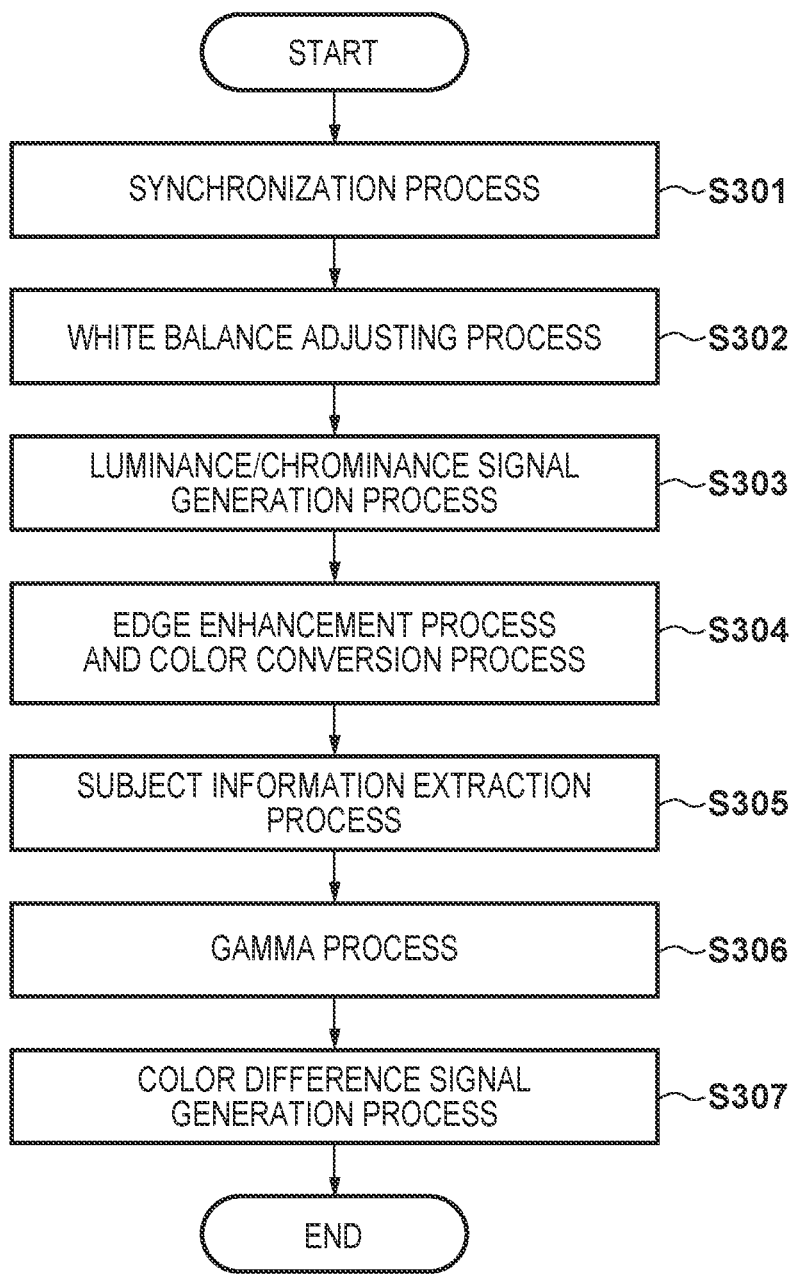
FIG. 3 is a flowchart showing processing performed in the image processing unit according to the embodiment.

Next, details of the image processing unit 105 will be described with reference to FIGS. 2 and 3. FIG. 2 is a block diagram illustrating a configuration of the image processing unit 105, and FIG. 3 is a flowchart showing processing performed by the image processing unit 105. In this embodiment, it is assumed that the image sensing unit 103 is covered with a color filter of Bayer arrangement. Accordingly, each pixel of the image sensing unit 103 outputs one of R, G and B image signals.

First in step S301, image signals inputted from the A/D converter 104 in FIG. 1 is inputted to a synchronization processing unit 200. The synchronization processing unit 200 performs synchronization process on inputted R, G and B image signals to generate R, G and B color signals for each pixel. Next in step S302, a WB amplifying unit 201 applies gains to the generated R, G and B color signals of each pixel based on white balance gains calculated by the system controller 50 in a known process, thereby correcting white balance. The R, G and B color signals whose white balance is corrected by the WB amplifying unit 201 are inputted to a luminance/chrominance signal generation unit 202 in step S303. The luminance/chrominance signal generation unit 202 generates a luminance signal Y from the R, G and B color signals, and outputs the generated luminance signal Y to an edge enhancement unit 203, and outputs the R, G and B color signals to a color conversion unit 205.

In step S304, the edge enhancement unit 203 performs an edge enhancement process on the luminance signal Y, and outputs the result to a luminance gamma processing unit 204. Meanwhile, the color conversion unit 205 applies a matrix operation to the R, G and B color signals, converts them to have a desired color balance, and outputs the result to a chrominance gamma processing unit 206 and a subject information extraction unit 208.

In step S305, the subject information extraction unit 208 extracts information on the subject in a captured image based on the face/face parts detection information output from the face/face parts detection unit 113 and the R, G and B color signals output from the color conversion unit 205 (subject information detection). Here, the information on the subject includes the number of subject/subjects in the captured image, the size of each subject, the positional relationship between the subjects, how each subject is illuminated, the shadow information of each subject, and so on. For example, the number, size/sizes and positional relationship of the subject/subjects are detected from the coordinate position information of each face/face part outputted by the face/face parts detection unit 113, and how each subject is illuminated and the shadow information are detected from the entire captured image, the average luminance information and luminance histogram information of each object.

In step S306, the luminance gamma processing unit 204 performs a gamma process on the luminance signal Y, and outputs the result to the image memory 106 via the memory controller 107. Meanwhile, the chrominance gamma processing unit 206 performs gamma correction on the R, G and B color signals, and outputs the result to a color difference signal generation unit 207. In step S307, the color difference signal generation unit 207 generates color difference signals R-Y and B-Y from the R, G and B signals, and outputs the result to the image memory 106 via the memory controller 107.

Figure 4:
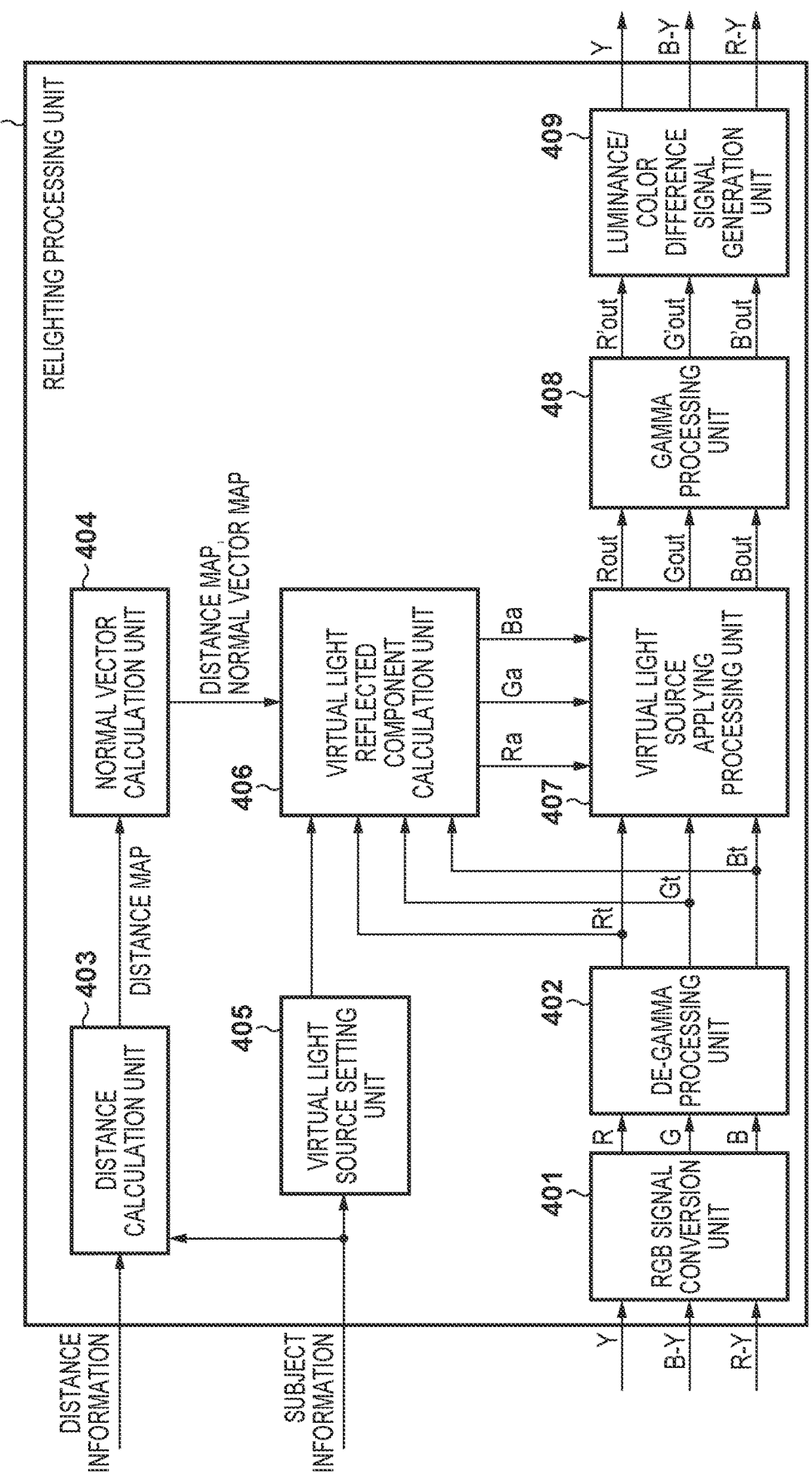
FIG. 4 is a block diagram showing a configuration of a relighting processing unit according to the embodiment.

Next, the relighting processing according to the present invention will be explained. FIG. 4 is a block diagram illustrating the configuration of the relighting processing unit 114. The relighting processing unit 114 reads the luminance signal Y and the color difference signals B-Y and R-Y processed by the image processing unit 105 and recorded in the image memory 106, takes them as inputs, and perform relighting processing using a virtual light source.

First, an RGB signal conversion unit 401 converts the input luminance signal Y and the color difference signals R-Y and B-Y into R, G and B signals, and outputs the result to a de-gamma processing unit 402. The de-gamma processing unit 402 performs an operation (de-gamma processing) whose characteristics are opposite to those of the gamma correction performed by the luminance gamma processing unit 204 and the chrominance gamma processing unit 206 of the image processing unit 105, and converts the R, G and B signals to linear data. The de-gamma processing unit 402 outputs the R, G and B signals that are converted to the linear data (Rt, Gt and Bt) to a virtual light source reflected component calculation unit 406 and a virtual light source applying processing unit 407.

On the other hand, a distance calculation unit 403 calculates a distance map based on the distance information of the subject acquired from the distance measuring sensor 123. The distance information of the subject is two-dimensional distance information obtained for each pixel of the captured image. A normal vector calculation unit 404 calculates a normal vector map as shape information representing the shape of the subject from the distance map calculated by the distance calculation unit 403. As a method of generating a normal vector map from the distance map, a known technique is used, but a specific processing example will be described with reference to FIG. 5.

Figure 5:
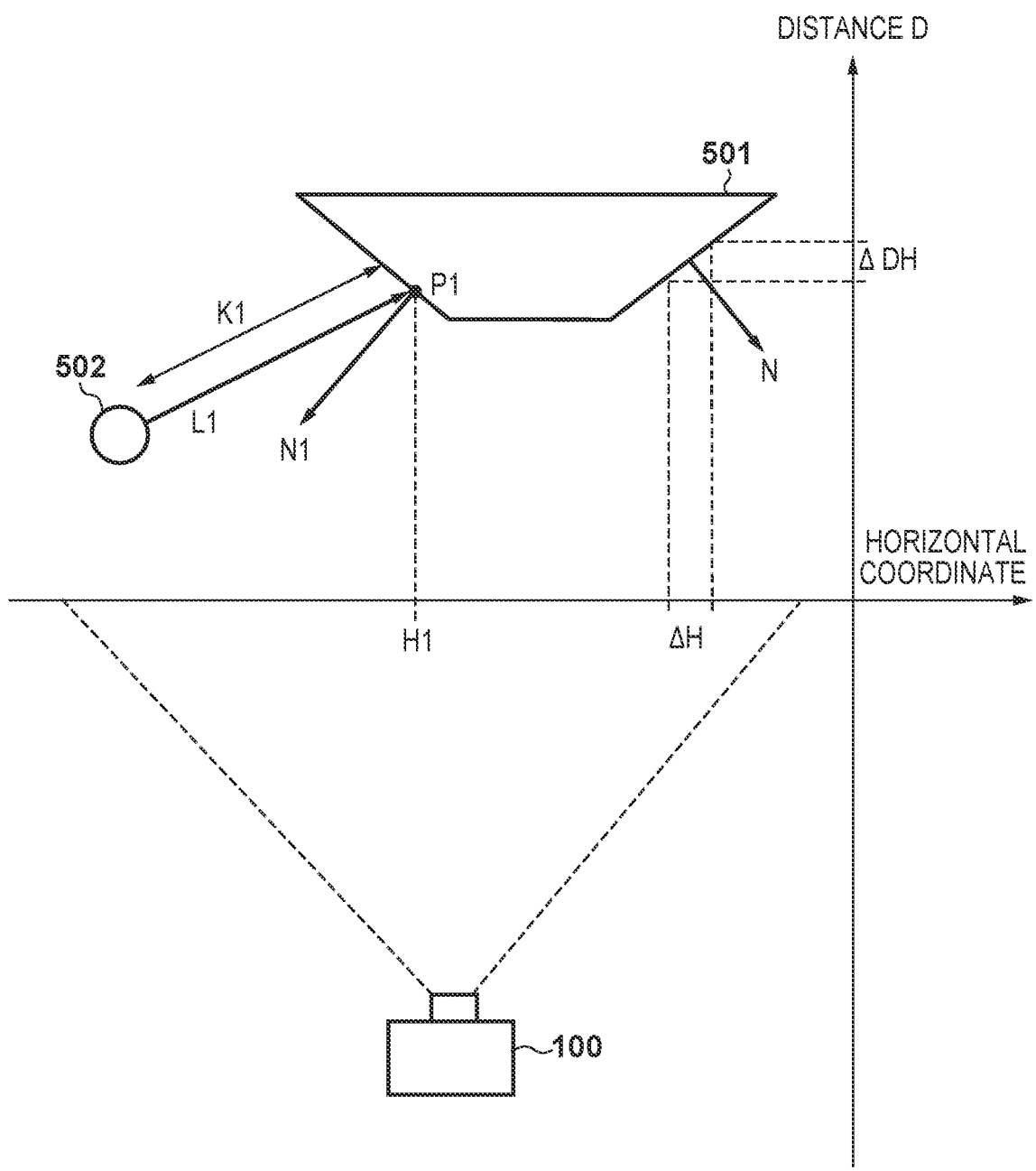
FIG. 5 is a schematic view for explaining reflection of virtual light from a virtual light source according to the embodiment.

FIG. 5 is a diagram showing the relationship between the image shooting coordinates with respect to the camera 100 and a subject. For example, with respect to the subject 501 as shown in FIG. 5, from a difference ΔDH of the distance D with respect to a difference ΔH of a captured image in the horizontal direction and, although not shown, a difference ΔDV of the distance D with respect to a difference ΔV of the captured image in the vertical direction, inclination information of a part of the subject 501 is calculated. Then, a normal vector N is calculated from the calculated inclination information of the part of the subject. By performing the above processing on each pixel of the captured image, it is possible to calculate the normal vector N corresponding to each pixel of the captured image. The normal vector calculation unit 404 outputs the normal vector N corresponding to each pixel of the captured image to the virtual light source reflected component calculation unit 406 as the normal vector map.

Although the distance calculation unit 403 and the normal vector calculation unit 404 are described as being configured in the relighting processing unit 114, the present invention is not limited to this, and for example, may be configured in the distance measuring sensor 123 or the image processing unit 105, or may be configured independently.

A virtual light source setting unit 405 sets the parameters of a virtual light source based on the subject information inputted from the subject information extraction unit 208 of the image processing unit 105. For example, in a case where it is desired to increase the brightness of the entire face of a subject whose entire face is dark, parameters such as the position, the irradiation range, and the intensity of the virtual light source are set such that the entire face is included in the irradiation range of the virtual light source.

Figure 6A:
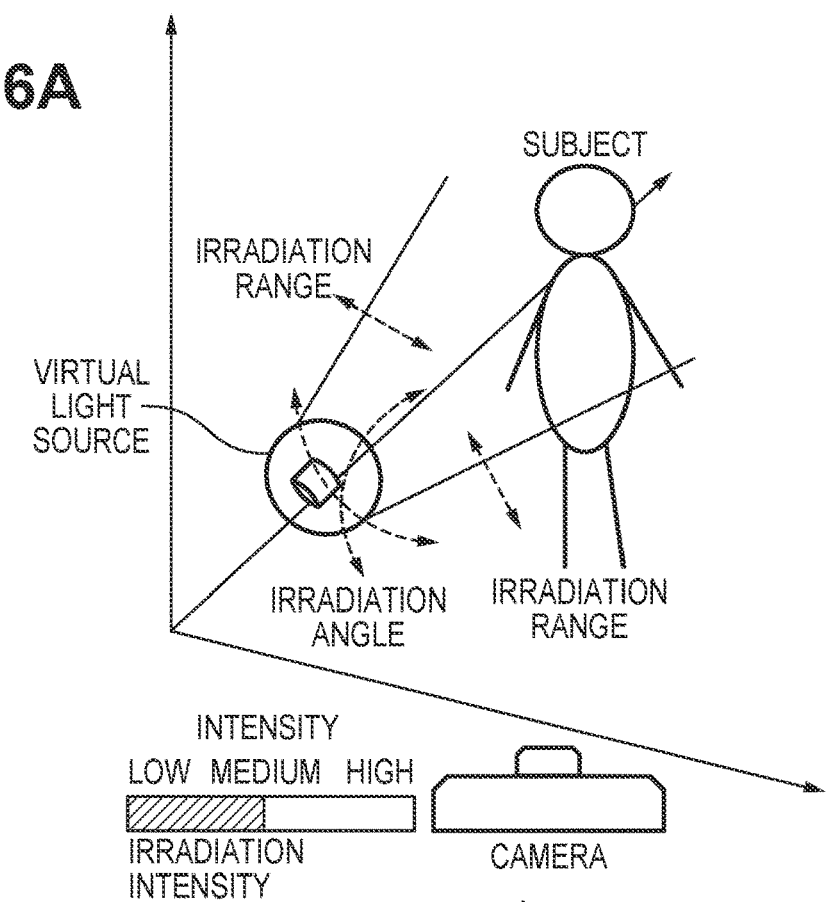
FIGS. 6A and 6B are explanatory diagrams of parameter setting of the virtual light source according to the embodiment.
Figure 6B:
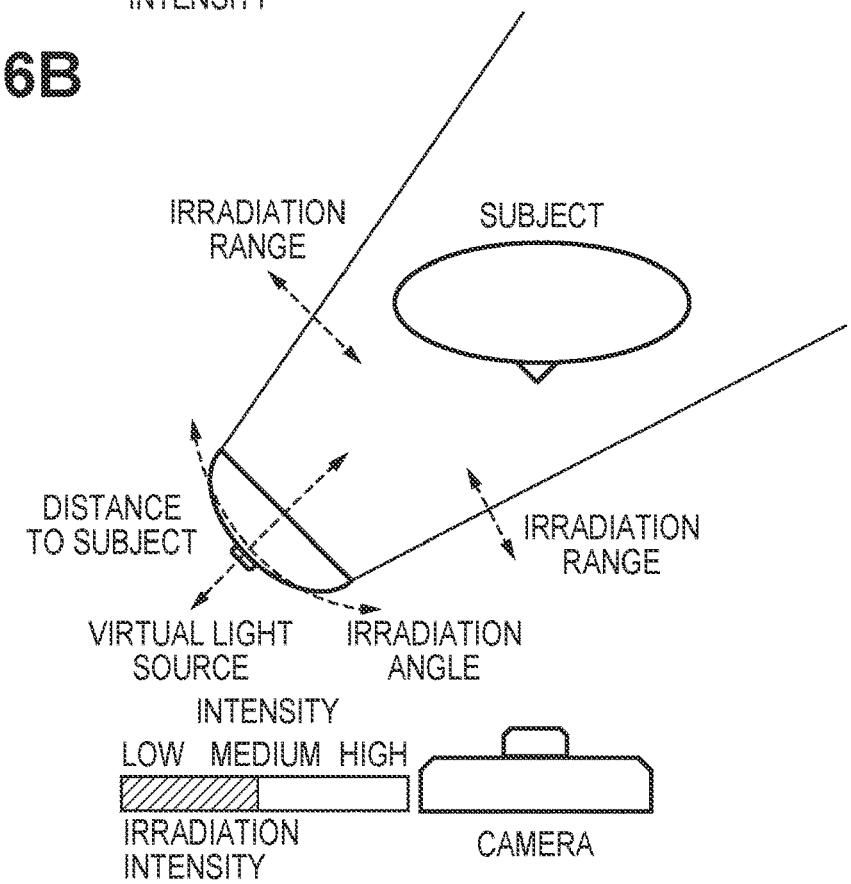

Here, with reference to FIG. 6A and FIG. 6B, parameters to be set for a virtual light source will be described taking a case where the subject is one person as an example. FIG. 6A is a perspective view showing the positional relationship between the subject and the virtual light source, and FIG. 6B is a plan view showing the positional relationship between the subject and the virtual light source. Regarding the position of the virtual light source, if the distance between the virtual light source and the subject is set to be short, the light of the virtual light source strongly hits the subject, and conversely if the distance to the subject is set to be long, the light of the virtual light source hit the subject weakly. Regarding the irradiation range of the virtual light source, if the irradiation range of the virtual light source is set to be wide, light can illuminate the entire subject. Conversely, if the irradiation range is set to be narrow, light can illuminate only a part of the subject. Regarding the intensity of the virtual light source, if the intensity of the virtual light source is set to be strong, light strongly illuminates the subject, and conversely if the intensity is set to be weak, light weakly illuminates the subject.

In the virtual light source reflected component calculation unit 406, based on the distance K between the light source and the subject, the normal information N and the parameters of the virtual light source set by and the virtual light source setting unit 405, light virtually irradiated from the set virtual light source, the component which will be reflected by the subject is calculated. Hereinafter, light virtually irradiated from the virtual light source is called "virtual light". Specifically, the reflected components of the virtual light at the part of the subject corresponding to the coordinate position of the captured image is calculated so that the reflected components are inversely proportional to the square of the distance K between the virtual light source and the part of the subject corresponding to each pixel and is proportional to the inner product of the vector of the normal N and the vector of the light source direction L.

Here, a general calculation method of the reflected components of virtual light will be described with reference to FIG. 5. In FIG. 5, for the sake of simplicity of explanation, only the horizontal direction of the captured image is shown, but as described above, the direction perpendicular to the drawing is the vertical direction of the captured image. In the following description, a method of calculating the reflected components of virtual light at the point P1 on the subject 501 corresponding to the horizontal pixel position H1 and the vertical pixel position V1 (not shown) in the captured image will be described. In FIG. 5, the virtual light source 502 is set for the subject 501. The reflected components of the virtual light at the position (H1, V1) of the captured image shot by the camera 100 is proportional to the inner product of the normal vector N1 at the point P1 on the subject 501 and the light source direction vector L1 of the virtual light source 502, and inversely proportional to the square of the distance K1 between the virtual light source 502 and the point P1. The normal vector N1 and the light source direction vector L1 are three-dimensional vectors consisting of a horizontal direction, a vertical direction, and a depth direction (the direction indicated by the distance D in FIG. 5). When this relationship is expressed by a mathematical expression, the reflected components (Ra, Ga, Ba) of virtual light at the point P1 on the subject 501 are as shown by the following expressions (1).

$$Ra = \alpha \times (-L1 \cdot N1)/K1^2 \times Rt$$

$$Ga = \alpha \times (-L1 \cdot N1)/K1^2 \times Gt$$

$$Ba = \alpha \times (-L1 \cdot N1)/K1^2 \times Bt \qquad (1)$$

Here, α is the intensity of light from the virtual light source, the gain value of the rewriting correction amount, Rt, Gt, Bt are the RGB signals output from the de-gamma processing unit 402.

The reflected components (Ra, Ga, Ba) of the virtual light calculated as described above are output to the virtual light source applying processing unit 407. In the virtual light source addition applying unit 407, the processing shown by the following expressions (2) is performed in which reflected components (Ra, Ga, Ba) of the virtual light are added to the R, G and B signals output from the de-gamma processing unit 402.

$$Rout = Rt + Ra$$

$$Gout = Gt + Ga$$

$$Bout = Bt + Ba \quad (2)$$

The R, B and G signals (Rout, Gout, Bout) which have undergone the relighting processed by the virtual light source applying processing unit 407 are input to a gamma processing unit 408 where gamma correction is performed. Then, a luminance/color difference signal generation unit 409 generates and outputs the luminance signal Y and the color difference signals R-Y and B-Y signals from the gamma-processed R, G and B signals (R'out, G'out, B'out).

Figure 7A:
FIGS. 7A and 7B are views showing examples of images before and after relighting processing according to the embodiment.
Figure 7B:
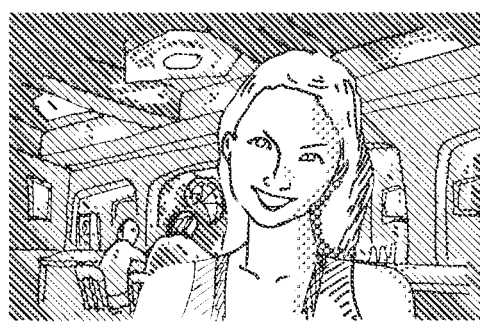

An example of the relighting processing described above in the relighting processing unit 114 is shown in FIGS. 7A and 7B. FIG. 7A is an example of a captured image before relighting processing, and FIG. 7B is an example of the captured image after relighting processing. The subject which is dark as shown in FIG. 7A is corrected to be bright as shown in FIG. 7B by performing relighting processing which applies virtual light.

The system controller 50 accumulates the luminance signal Y and the color difference signals R-Y and B-Y output from the relighting processing unit 114 in the image memory 106 under the control of the memory controller 107 and then the codec unit 110 compresses and encodes them. In addition, The processed signals are recorded in the recording medium 112 via the I/F 111.

Next, the relighting processing by the relighting processing unit 114 according to the present embodiment will be described with reference to the flowcharts of FIGS. 8 and 9. This processing is performed on the image processed by the image processing unit 105 and stored in the image memory 106 (namely, on the luminance signal Y and the color difference signals R-Y and B-Y) when the relighting processing is selected by an operation from a user via the operation unit 120.

First, in step S801, the virtual light source setting unit 405 acquires the subject information, acquired by the subject information extraction unit 208 in step S305, such as the number, size, and positional relationship of the subject/subjects included in the image subjected to the relighting processing. In step S802, it is determined whether the number of subject/subjects is one or more. In the case of one person, the process proceeds to step S803, and in the case of plural people, the process proceeds to step S903 in FIG. 9.

In step S803, the distance calculation unit 403 generates a weighting map (mapK) depending on the distance between the digital camera 100 and the subject with respect to the area of the detected subject. Specifically, first, the distance calculation unit 403 calculates the distance K on a pixel-by-pixel basis (distance map) based on the two-dimensional subject distance information obtained pixel by pixel of the captured image acquired from the distance measuring sensor 123. Then, a value obtained by normalizing $1/(K^2)$ with an arbitrary bit width on a pixel-by-pixel basis is defined as a distance weighting map (mapK).

Next, in step S804, a normal vector map (mapN) is generated with respect to the area of the detected subject in the normal vector calculation unit 404 based on the distance map acquired from the distance calculation unit 403. Specifically, as described with reference to FIG. 5, the subject normal vector N is calculated on a pixel-by-pixel basis and its direction cosine with respect to each coordinate axis direction is calculated. Then, the obtained direction cosine for each pixel is represented by an arbitrary bit width, and it is taken as the normal weighting map (mapN).

In step S805, the virtual light source setting unit 405 generates a virtual light weighting map for the detected subject region. More specifically, the light source direction vector −L of the virtual light source is calculated for each pixel, and the direction cosine of the vector −L for each coordinate axis direction is calculated. Then, the obtained direction cosine is represented by an arbitrary bit width on a pixel-by-pixel basis, and taken as a weighting map (mapL) depending on the virtual light source. The parameter setting of the virtual light source for calculating the light source direction vector −L of the virtual light source is determined based on the subject information inputted from the subject information extraction unit 208. For example, when the luminance distribution in the acquired face region is biased, the position, the irradiation range, and the intensity of the virtual light source are determined so that the virtual light hits the region having the low luminance value.

For example, if the coordinates in the captured image of the region with low luminance value are (x1, y1), the reflected components (Ra (x1, y1), Ga (x1, y1), Ba (x1, y1), Ba)) are expressed by the following expressions (3).

$$Ra(x1,y1) = \alpha \times (-L(x1,y1) \cdot N(x1,y1))/K(x1,y1)^2 \times Rt$$

$$Ga(x1,y1) = \alpha \times (-L(x1,y1) \cdot N(x1,y1))/K(x1,y1)^2 \times Gt$$

$$Ba(x1,y1) = \alpha \times (-L(x1,y1) \cdot N(x1,y1))/K(x1,y1)^2 \times Bt \quad (3)$$

In the equation (3), α is the light intensity of the virtual light source. L(x1, y1) is the light source direction vector of the virtual light source at the position on the subject corresponding to the coordinate (x1, y1), N(x1, y1) is the normal vector at the position on the subject corresponding to the coordinate (x1, y1). Further, K(x1, y1) indicates the distance between the virtual light source and the position on the subject corresponding to the coordinates (x1, y1). In order that the virtual light illuminate the subject at the coordinates (x1, y1) located in an area where the luminance value is row, the intensity α of the virtual light source and the distance K(x1, y1) to the subject are controlled so that (Ra(x1, y1), Ga(x1, y1), Ba(x1, y1)) have positive values. Also, coordinate information having a luminance value lower than an arbitrary threshold value is acquired based on the acquired luminance distribution information in the face area, and the irradiation range of the virtual light source is controlled so as to include the coordinates in the coordinate information. Further, since there is a possibility that harmful effects such as high-light detail loss and tone value inversion may occur if the intensity α of the virtual light source is set too high, the range of the intensity α of the virtual light source is controlled within a given range β with respect to ±β of an average luminance value in a high luminance region outside the irradiation range. Through the processing described above, the virtual light source setting unit 405 calculates the range of the position of the virtual light source, the range to be irradiated, the range of the intensity, and determines the setting values by taking the average values within the respective ranges as the position of the virtual light source, the irradiation range, and the intensity.

In step S806, the reflected components (Ra, Ga, Ba) of the virtual light is calculated for the area of the detected subject in the virtual light source reflected component calculation unit 406. The reflected components (Ra, Ga, Ba) can be calculated using the expressions (1) as described above. The expressions (1) are replaced by the weighting map (mapK) depending on the distance obtained in step S803, the weighting map (mapN) depending on the normal of the subject obtained in step S804, and the weighting map (mapL) depending on the virtual light source obtained in step S805. In other words, the reflected components of virtual light can be calculated using the following expressions (4).

$$Ra = \alpha \times mapL \cdot mapN \cdot mapK \times Rt$$

$$Ga = \alpha \times mapL \cdot mapN \cdot mapK \times Gt$$

$$Ba = \alpha \times mapL \cdot mapN \cdot mapK \times Bt \quad (4)$$

in step S807, the relighting processing is performed. Specifically, as shown in the expressions (2) above, the reflected components (Ra, Ga, Ba) of the virtual light calculated in step S806 are added to the outputs (Rt, Gt, Bt) from the de-gamma processing unit 402 in the virtual light source applying processing unit 407. Upon completion of the relighting processing, the processing by the relighting processing unit 114 is terminated.

As a result of the above processing, the relighting processing unit 114 performs relighting processing when there is only one subject in the captured image.

Figure 9:
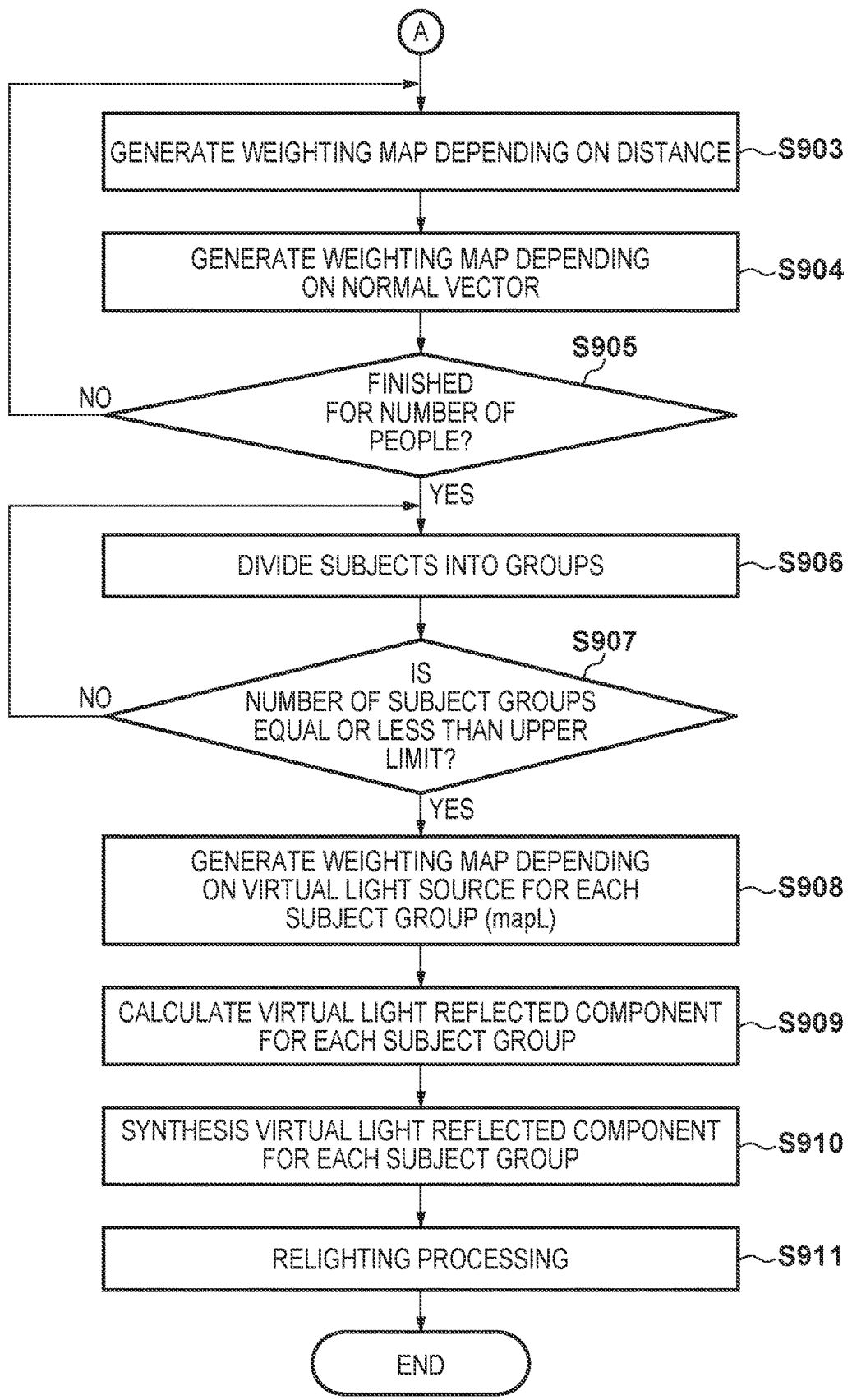
FIG. 9 is a flowchart showing the relighting processing according to the embodiment.

On the other hand, if it is determined in step S802 that the number of people of the subject is plural, the process proceeds to step S903 in FIG. 9. In step S903, the distance calculation unit 403 generates a weighting map (mapK) depending on the distance between the digital camera 100 and the subject in the same manner as in step S803. At this time, a weighting map (mapK) depending on distance is generated for one of the plurality of detected subjects.

Next, in step S904, similarly to step S804, a normal vector calculation unit 404 generates a normal weighting map (mapN). At this time, the normal weighting map (mapN) is generated for the same subject as in step S903.

In step S905, it is determined whether or not the processes in steps S903 and S904 are completed by the number of detected subjects. If not completed, the process returns to step S903, processes are performed for another person, and if completed, the process proceeds to step S906.

In step S906, the virtual light source setting unit 405 divides the subjects in the captured image into groups. Specifically, the subjects are divided into groups based on the subject information (the number of subjects in the captured image, the sizes of the subjects, the positional relationship between the subjects, the shadow information of the subjects) acquired in step S801.

Figure 10A:
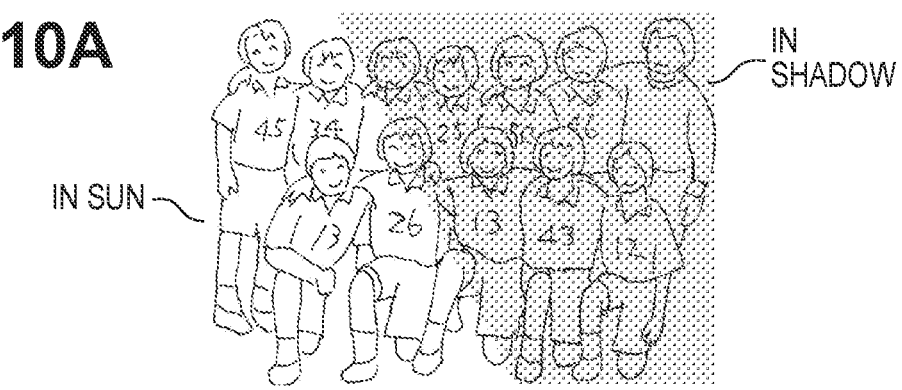
FIGS. 10A to 10D are diagrams illustrating the relighting processing performed on a plurality of people according to the embodiment.
Figure 10B:
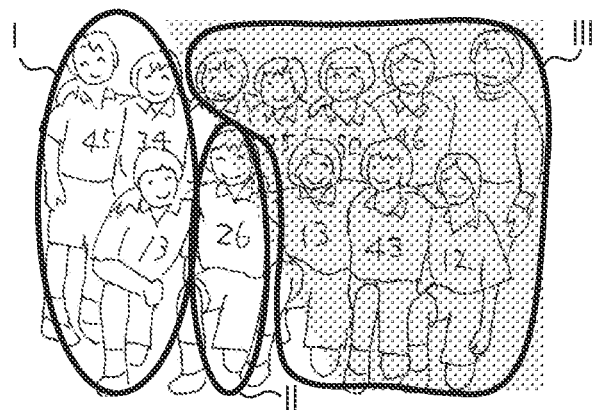

Here, the grouping of the subjects performed in step S906 will be described with reference to FIGS. 10A to 10D and FIG. 11. FIGS. 10A to 10D show examples of a captured image in the case where the captured image includes a plurality of subjects. FIG. 10A is a captured image before relighting processing, and FIG. 10B shows a conceptual diagram in which the subjects are grouped in the virtual light source setting unit 405. As shown in FIG. 10B, the grouping of the subjects is adjusted such that the subjects that are close to each other and have the same shadow information belong to the same subject group.

In step S907, it is determined whether or not the number of subject groups set in the virtual light source setting unit 405 in step S906 is equal to or less than an upper limit value. If it is equal to or less than the upper limit value, the process advances to step S908, and if it exceeds the upper limit value, the process returns to step S906 and adjusts the number of groups so as to be equal to or less than the upper limit value.

Note that after dividing the subjects into the subject group, which subject has been classified into which group may be displayed on the display unit 109 so that the user can identify the grouping result. As a display example at this time, for example, as shown in FIG. 10B, each group may be surrounded by a frame and a group name may be displayed. Alternatively, indicators (for example, group name, icon, color frame) that indicate groups may be displayed for each subject.

Further, the user may change the result automatically classified by the digital camera 100. In that case, the user inputs an instruction to change the classification result via the operation unit 120. Various methods are conceivable as the changing method. For example, when the group is surrounded by a frame as shown in FIG. 10B, for example, by changing the size of the frame, the subject included in each frame can be changed. Alternatively, at least one subject may be selected by a user operation, and the group to which the selected user is classified may be specified.

In step S908, the virtual light source setting unit 405 sets parameters such as the position, irradiation range, and intensity of the virtual light source for each subject group determined in step S906. Parameters such as the position, irradiation range, and intensity of the virtual light source are set in the same manner as in the above-described step S805, where there is a difference in that the parameters are set for one subject in step S805, but the parameters are set for each subject group in step S908. Then, based on the parameters of the virtual light source set for each subject group, a weighting map depending on the virtual light source is generated. More specifically, the light source direction vector −L of the virtual light source is calculated for each pixel, and the direction cosine for each coordinate axis direction is calculated. The obtained direction cosine is represented by an arbitrary bit width and taken as the weighting map (map L) depending on the virtual light source.

FIG. 11 shows an example of a table of virtual light source parameter settings used in the virtual light source setting unit 405 in step S908. Reference numeral 1101 denotes the subject No.; 1102, coordinates of the center of a face of the subject; 1103, the shadow information; and 1104, the subject grouping information. Incidentally, in FIG. 11, the subjects in the front row of FIGS. 10A to 10D are labeled by 1 to 5 in order from the left side, and the subjects in the rear row are labeled by 6 to 12 in order from the left side. Subject No. and the coordinates of the center of the face are acquired from the detection result of the face/face parts detection unit 113, and the shadow information is acquired from the luminance distribution information in the face area. The grouping of the subjects is adjusted such that the subjects that are close to each other and have the same shadow information belong to the same subject group. In the example of FIG. 11, subjects are classified into three groups; group I for a subject whose whole face is bright, group II for a subject whose right upper part of the face is dark, and group III for a subject whose entire face is dark.

In step S909, using the parameters of the virtual light source set for each subject group determined in step S906, reflected components of virtual light are calculated in the virtual light source reflected component calculation unit 406. The reflected components (Ra, Ga, Ba) of the virtual light can be calculated by the above-described expressions (3). For each subject group, the expressions (3) are replaced by the weighting map (mapK) depending on the distance generated in step S903, the weighting map (mapN) depending on the normal of the subject generated in step S904, and the weighting map (mapL) depending on the virtual light source generated in step S908. Thus, the reflected components of the virtual light are calculated using the above-described expressions (4).

Figure 10C:
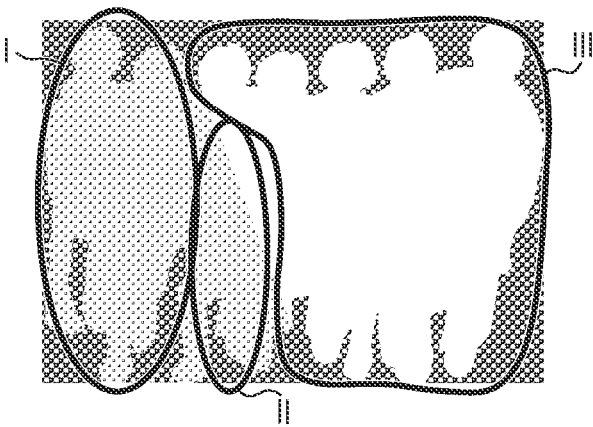

FIG. 10C is a conceptual diagram of the calculation result of the reflected components of the virtual light calculated by the virtual light source reflected component calculation unit 406. The calculation result of the virtual light reflected components shows the multiplication result of the gain a (intensity), the weighting map (map L) depending on the virtual light source, the normal weighting map (map N), and the weighting map (mapK) depending on the distance as described above.

In step S910, the reflected components of the virtual light calculated for each object group in step S909 are synthesized in the virtual light source reflected component calculation unit 406 to calculate reflected components (Ra, Ga, Ba) of virtual light from the virtual light source of the entire image. For example, in the example of the captured image shown in FIGS. 10A to 10D, the reflected components of virtual light of the subject groups I, II, and III are synthesized. A conventional synthesis method may be used here, as an example, a lighten composite process or the like may be used.

In step S911, the relighting processing is performed. Here, the relighting processing is performed using the formula (2) as in step S807, by adding the reflected components (Ra, Ga, Ba) of the virtual light calculated by the virtual light source reflected component calculation unit 406 in step S910 with the outputs (Rt, Gt, Bt) of the de-gamma processing unit 402 in the virtual light source applying processing unit 407.

Figure 10D:
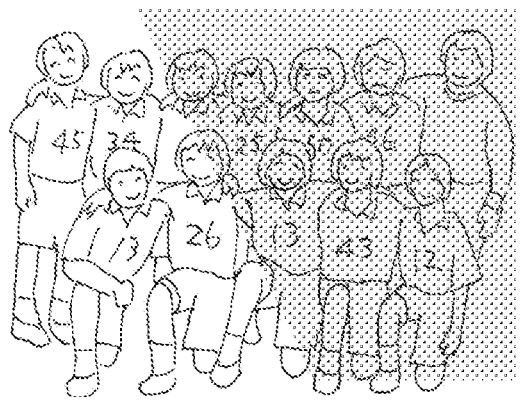

FIG. 10D is an example of the captured image after the relighting processing. In FIG. 10A, the faces of the subjects in the shadow are dark, whereas in FIG. 10D, all subjects are corrected brightly by the relighting processing.

In the case where the image after the relighting processing is displayed on the display unit 109, it may be displayed so that a user can identify which object is classified into which group when the relighting processing is performed. Furthermore, the user may change the displayed classification result, and the relighting processing may be redone. In this way, if the desired result of the relighting processing is not obtained, the user can redo the relighting processing.

With the above processing, the relighting processing unit 114 can perform the relighting processing on multiple subjects without taking a long time.

In the processes shown in FIGS. 8 and 9, it is described that the weighting map depending on the virtual light source is generated after generation of the weighting map depending on the distance and the normal weighting map, however, the order of generation is not limited thereto. After generating the weighting map depending on the virtual light source, the weighting map depending on distance and the normal weighting map may be generated, or these weighting maps may be generated in parallel.

Further, in the present embodiment, the digital camera 100 has been described as an example of the image capturing apparatus, however, the present invention can also be applied to an image processing device such as a personal computer. In that case, the image processing device may acquire an image captured by imaging means such as a camera, the user may arbitrarily set virtual light source parameters with respect to the acquired image, and the image processing apparatus may perform the relighting processing. If there is additional information such as face detection result, distance information, normal information, and so on, together with the image, the relighting processing may be performed using such information. Even in that case, grouping the subjects makes it unnecessary for the user to set the parameters of the virtual light source for each subject, so it is possible to perform the relighting processing without complicating the parameter setting method of the virtual light source.

Further, in the present embodiment, the case where there is one virtual light source for each subject or group has been described, however, the present invention is not limited to this. For example, it is configured to use a plurality of virtual light sources to perform the relighting processing such that one virtual light source may illuminate a subject from the upper right position of the subject and another virtual light source may illuminate the subject from the side of the subject.

Further, in the present embodiment, the case of correcting a subject to become brighter using an added light has been described, however, relighting for making a subject darker may be performed. In that case, the gain value α of the virtual light source is set to a minus value (subtracted light). In addition, specular reflection light may be added to the subject. In this way, any one of a plurality of types of light can be selected as virtual light.

Further, the method of calculating the distance D between the position of the virtual light source and the processing target pixel is not limited to the present embodiment, and any calculation method may be adopted. For example, the position of the camera and the position of the subject may be acquired as a three-dimensional position and a distance may be calculated in three dimensions.

In addition, in the case of adding virtual light, its intensity is calculated using an equation inversely proportional to the square of the distance, however, the present invention is not limited to calculating the addition amount of the virtual light by this method. For example, an equation which is inversely proportional to the distance D or an expression in which the irradiation range varies in a Gaussian distribution may be used.

In the above example, the case of detecting a person as a subject has been described, however, the subject is not limited to a person, and a predetermined subject (for example, a car, an animal, a plant, etc.) may be detected.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-029049, filed on Feb. 21, 2018, and 2019-018259, filed on Feb. 4, 2019, which are hereby incorporated by reference herein in their entirety.

What is claimed is:

1. A setting apparatus comprising at least one processor and/or circuit configured to function as following units:
   a setting unit that sets a virtual light parameter for applying an effect of irradiating virtual light on a plurality of subjects included in an image; and
   a classification unit that classifies the plurality of subjects into a plurality of groups based on a state of shadow,
   wherein the setting unit sets the virtual light parameter for each group classified by the classification unit.

2. The setting apparatus according to claim 1, wherein the at least one processor and/or circuit is configured to function as an image processing unit that applies an effect of irradiating virtual light on the plurality of subjects based on the virtual light parameter set by the setting unit.

3. The setting apparatus according to claim 2, wherein the at least one processor and/or circuit is configured to function as a shape acquisition unit that acquires shape information of the plurality of subjects,
   wherein the image processing unit applies an effect of irradiating virtual light on the plurality of subjects based on the virtual light parameter and the shape information.

4. The setting apparatus according to claim 3, wherein the at least one processor and/or circuit is configured to function as a distance acquisition unit that acquires distance information of the plurality of subjects,
   wherein the image processing unit applies an effect of irradiating virtual light on the plurality of subjects based on the virtual light parameter, the shape information, and the distance information.

5. The setting apparatus according to claim 3, wherein the at least one processor and/or circuit is configured to function as a distance acquisition unit that acquires distance information of the plurality of subjects,
   wherein the shape acquisition unit acquires shape information based on the distance information.

6. The setting apparatus according to claim 1, wherein the virtual light parameter includes an irradiation range and intensity of the virtual light.

7. The setting apparatus according to claim 1, wherein the setting unit sets the virtual light parameter for each group based on a user operation.

8. The setting apparatus according to claim 1, wherein the virtual light includes addition light that adds brightness to a subject, subtraction light that darkens a subject, specular reflection light that applies specular reflection effect on a subject.

9. The setting apparatus according to claim 1, wherein the at least one processor and/or circuit is configured to function as an image sensor that shoots a subject and obtains image data.

10. The setting apparatus according to claim 1, wherein the at least one processor and/or circuit is configured to function as a display controller that controls to display a result of the classification by the classification unit on a display.

11. The setting apparatus according to claim 1, wherein the at least one processor and/or circuit is configured to function as an input unit that accepts an instruction to change a result of the classification by the classification unit.

12. The setting apparatus according to claim 11, wherein the input unit accepts an instruction for selecting at least one subject and classifying the selected least one subject into a designated group.

13. The setting apparatus according to claim 2, wherein the at least one processor and/or circuit is configured to function as a display controller that controls to display a result of the classification by the classification unit on a display,
   wherein the result of the classification by the classification unit is displayed before applying the effect of irradiating the virtual light by the image processing unit.

14. The setting apparatus according to claim 2, wherein the at least one processor and/or circuit is configured to function as a display controller that controls to display a result of the classification by the classification unit on a display,
   wherein the result of the classification by the classification unit is displayed after applying the effect of irradiating the virtual light by the image processing unit.

15. The setting apparatus according to claim 14, wherein the at least one processor and/or circuit is configured to function as an input unit that accepts an instruction to change the result of the classification by the classification unit.

16. A setting method comprising:
   classifying a plurality of subjects included in an image into a plurality of groups based on a state of shadow,
   setting a virtual light parameter for applying an effect of irradiating virtual light on a plurality of subjects for each group classified by the classification unit.

17. A non-transitory storage medium readable by a computer, the storage medium storing a program that is executable by the computer, wherein the program includes program code for causing the computer to function as a setting apparatus, comprising:
   a setting unit that sets a virtual light parameter for applying an effect of irradiating virtual light on a plurality of subjects included in an image; and
   a classification unit that classifies the plurality of subjects into a plurality of groups based on a state of shadow,
   wherein the setting unit sets the virtual light parameter for each group classified by the classification unit.

* * * * *